Figure 1:
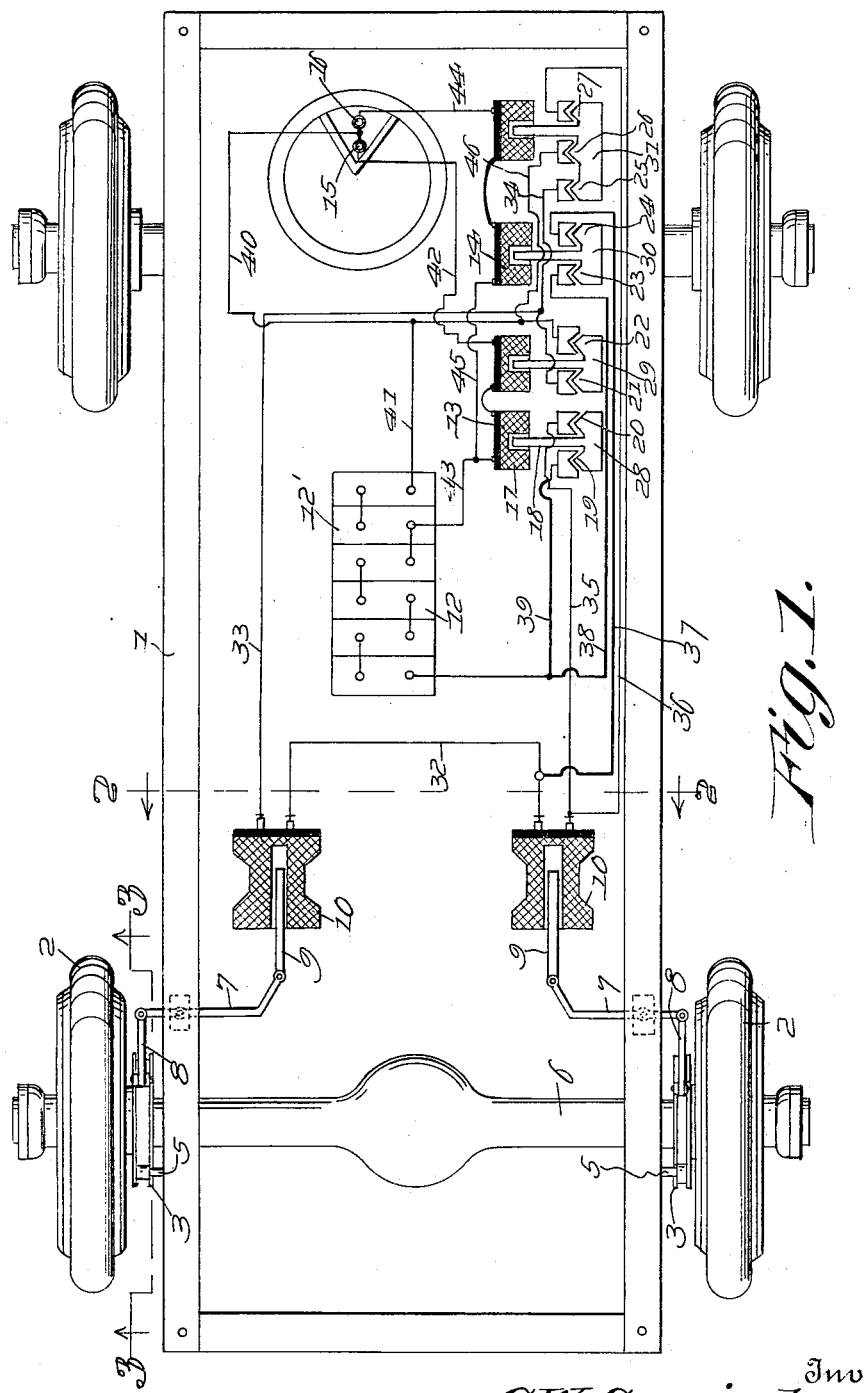

C. W. CUNNINGHAM.
ELECTRIC BRAKE FOR AUTOS.
APPLICATION FILED AUG. 8, 1918.

1,297,109.

Patented Mar. 11, 1919.
2 SHEETS—SHEET 1.

Inventor
C. W. Cunningham,
By
G. Wynne Talbert
Attorney

C. W. CUNNINGHAM.
ELECTRIC BRAKE FOR AUTOS.
APPLICATION FILED AUG. 8, 1918.
1,297,109.
Patented Mar. 11, 1919.
2 SHEETS—SHEET 2.
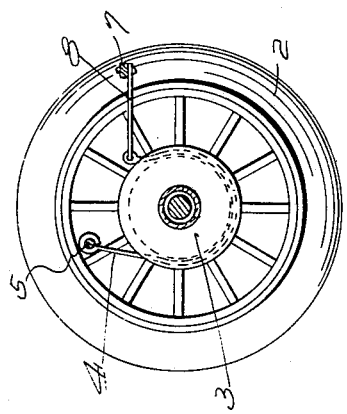
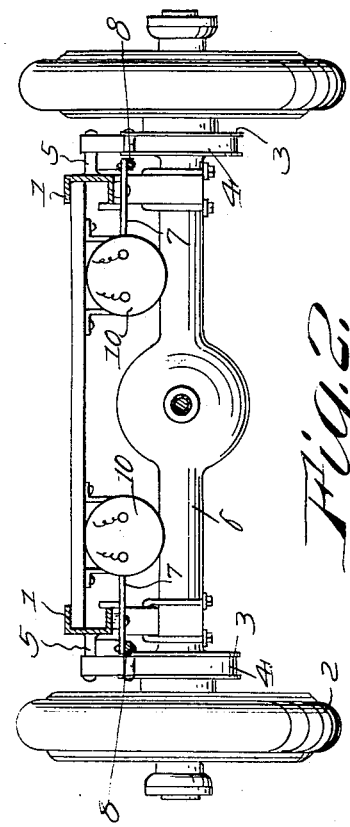
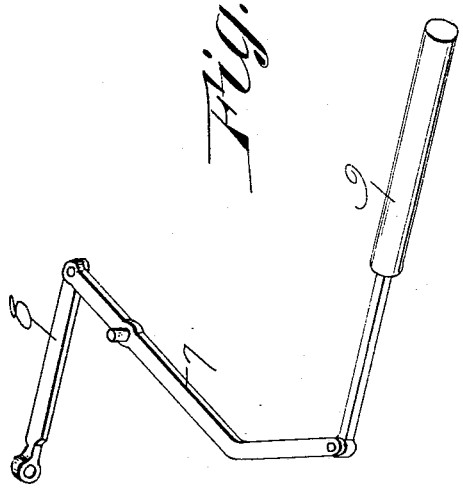
Inventor
C. W. Cunningham,
Attorney

UNITED STATES PATENT OFFICE.

CHARLES W. CUNNINGHAM, OF DECATUR, ILLINOIS.

ELECTRIC BRAKE FOR AUTOS.

1,297,109.           Specification of Letters Patent.     Patented Mar. 11, 1919.

Application filed August 8, 1918. Serial No. 248,904.

*To all whom it may concern:*

Be it known that I, CHARLES W. CUNNINGHAM, a citizen of the United States, residing at Decatur, in the county of Macon and State of Illinois, have invented new and useful Improvements in Electric Brakes for Autos, of which the following is a specification.

The principal object of the invention is to provide a brake of this character for auto vehicles, the brake being controlled from the means in close proximity to the steering mechanism so that it may be easily reached and operated without undue effort on the part of the chauffeur or driver of the vehicle in question.

A further object of the invention resides in the provision of a brake of this character which may be set with different degrees of intensity.

A still further object seeks the provision of an electric brake which is simple in construction, durable and effective in operation, inexpensive to manufacture and easy of application to an auto vehicle.

Still further and other objects of the invention appear in the following detail description which follows:

To the exact embodiment in which it is shown and described, the invention is not to be restricted. The right is reserved to make such changes or alterations as the actual reduction to practice may show to be desirable in so far as such changes or alterations may be comprehended in spirit by the subjoined claims.

The same numerals of reference designate the same parts throughout the several figures of the drawings, wherein:

Figure 1 is a plan view of an auto vehicle running gear and chassis, the improved brake being shown applied thereto and the electrical control means being indicated diametrical, Fig. 2 is a section on the line 2—2 of Fig. 1, Fig. 3 is a section on the line 3—3 of Fig. 1, Fig. 4 is a perspective view of one of the brake band actuating lever mechanisms.

Illustrated in the drawings, there is the chassis frame 1 and rear or driving wheels 2 of an auto vehicle. These driving wheels are equipped with the usual brake hub 3 coöperating with which are the brake bands 4, the latter being pivotally mounted, as shown at 5, which is the usual means of mounting to the chassis frame 1. Pivotally mounted on the chassis frame to the forward of the rear axle 6 there are levers 7 at whose one end links 8 pivotally connect, the remaining ends of the links pivotally connecting with the remaining ends of the brake bands 3. The levers 7 are of the peculiar shape shown and at those ends remote from those which connect with the links 8, they pivotally connect with the ends of the plungers 9, the latter being movable into and out of the solenoids 10 which are suitably supported on a bracket or support 11 attached to the chassis frame 1.

To provide for the energizing of the solenoids 10, there is a battery 12, preferably of the accumulator type, oil switches 13 and 14 and circuit closing means 15 and 16, the latter may be of any acceptable type, but in the present instance are indicated as push buttons. It is intended that the battery 12 shall be mounted at any suitable place within the vehicle and likewise the oil switches 13 and 14 at any place where they will be out of the way.

The push buttons 15 and 16, however, are to be mounted in close proximity to the steering wheel and, if a suitable cable is provided to carry the electrical contact wires to and away from the push buttons, the latter may be mounted directly on the steering wheel so that they will always be convenient for the operation of the device in the manner hereinafter described. The oil switches 13 and 14 are of the solenoid operated type, being closed by the action of powerful direct current solenoids 17 and suitable plungers 18, but they are opened by means of gravity attraction.

The oil switch 13 is equipped with the contact lugs or members 19, 20, 21 and 22, while the oil switch 14 has similar contact lugs or members 23, 24, 25, 26 and 27. The contact members 19 and 20 are placed in electrical communication by the switch member 28 carried by one of the solenoids 18. The contact members 21 and 22 are similarly connected electrically by the switch member 29; the contact members 23 and 24 by the switch member 30; and the contacts 25 and 26 and 27 by the switch member 31.

The windings of the two solenoids 10 are interconnected by a conductor 32. The remaining end of the winding of one solenoid 10 connects by means of the wire 33 with the contact members 21 and 25, the two latter contact members being interconnected by the conductor 34. The remaining end of the winding of the other solenoid 10 connects by means of the conductor 35 with the contact member 20.

The conductor 36 is tapped in on the conductor 35 and electrically connects the latter with the contact member 27. Similarly, a conductor 37 is tapped in on the wire 32 and connects the latter electrically with the contact member 24. The positive terminal of the battery 12 connects with the contact member 25 by means of the conductor 38. A conductor 39 is tapped in on the conductor 38 and electrically connects the latter with the contact member 19.

The push buttons 15 and 16 are connected in parallel and a conductor 40 connects with one terminal of each. This conductor 40 is tapped in on the conductor 41 which connects the contact member 22 with the negative terminal of the battery 12. The remaining terminal of the push buttons 15 and 16 by means of a conductor 42 is connected to one terminal of the solenoid couple 17 of the oil switch 13 and the remaining terminal of this solenoid couple 17 connects with the positive terminal of the cell 12' of the battery 12 by means of the conductor 43. The push button 16, by means of the conductor 44 connects with one terminal of the solenoid couple 17 of the oil switch 14, and the remaining terminal of this solenoid couple connects with the positive terminal of the cell 12' by means of a conductor 45 which is tapped in on the conductor 43. The contact member 26 of the oil switch 14 by means of a conductor 46 connects with the negative terminal of the battery 12 through the conductor 41 into which the conductor 46 is tapped.

In the operation of the improved brake, the design is to throw the two solenoids 10 in series across the battery 12 to effect the setting of the brake bands for service stopping. For emergency stopping, the peculiar arrangement permits of the throwing of the solenoids in parallel across the battery 12, when the brake bands will set with a greater degree of intensity than when the solenoids are in series. For service stopping, the push button 15 is employed. When it is depressed, a circuit is established comprising the cell constituting the end cell of the battery and the cell 12' from the positive terminal of which latter cell a current passes over the conductor 43, through the solenoids 17 of the oil switch 13, over the conductor 42 through the push button 15, over the conductor 40, the conductor 41 and to the negative terminal of the battery 12. This results in the solenoids 17 of the oil switch 13 raising their plungers 18 to bring the switch members 28 and 29 of the latter across the contact members 19 and 20 and 21 and 22. Thereupon, a circuit is established which places the two solenoids 10 in series across the battery 12. The current from the battery passes over a portion of the conductor 38, over the conductor 39, the contact member 19, the attendant switch member 28, the contact member 20, the conductor 35, through the winding of one solenoid 10, over the conductor 32, through the winding of the other solenoid 10, the conductor 33, a portion of the conductor 34, the contact member 21, the switch member 29, the contact member 22 and the conductor 41 and the negative terminal of the battery. The solenoid cores 9 are thereupon sucked in with the result that the levers 7 are rocked and the brake bands set against the brake hub for the service stopping of the vehicle.

In the event that it is desired to set the brakes tight enough for an emergency stop, the push button 16 is depressed; thereupon the cell 12' and the cell at the negative end of the battery 12 energize the solenoids 17 of the oil switch 14, the circuit permitting this energization comprising in order, the conductor 43, the conductor 45, the solenoids 17 of the oil switch 14, the conductor 44, the push button 16, the conductor 40, and a portion of the conductor 41. The solenoids 17 of the switch 14, as a result of becoming energized raise their switch members 30 and 31, thus electrically connecting the contact members 23 and 24 and the contact members 25, 26 and 27. The solenoids 10 are then thrown in parallel across the battery 12 from which current leaves by the positive terminal, passing over the conductor 38 to the contact member 23, over the switch member 30, the contact member 24, the conductor 37 to the point where it is tapped in on the conductor 32. The current here divides, part passing through the winding of one solenoid 10, over the conductor 36, the contact member 27, the switch member 31, the contact member 26, the conductor 46 and the conductor 41 to the negative terminal of the battery. The remaining portion of the current passes over the conductor 32 through the winding of the other solenoid 10, over the conductor 33 to its point of connection with the conductor 34, then over the latter conductor to the contact member 25, then the switch member 31, the contact member 26 and over the same course which the other division of the current takes to the negative terminal of the battery.

It will be observed that the solenoids of the oil switches are energized only by a portion of the battery, but the whole battery is employed for energizing the solenoids 10. Of course, the conductor 43 may be connected in at any point of the battery to obtain cells sufficient to operate the solenoids of the oil switches, but it is thought, in the present instance that the two cells shown for this purpose are sufficient.

While the invention is shown and described as comprising push buttons for mounting on the steering wheel and solenoid operated oil switches, it is obvious that this part of the device may be dispensed with and replaced with oil switches mechanically operated and connected with foot brakes to permit the manipulation of the switches to accomplish the useful purpose herein described.

From the foregoing description and the accompanying drawings, it is believed that a clear enough understanding of the invention will be had to render unnecessary any further description in the premises.

The invention having been described, what is claimed as new and useful is:—

1. In a vehicle brake of the character described, the combination with the brake bands of an auto vehicle, of solenoids carried by the vehicle chassis, plungers movable into and out of the solenoids, connections between the plungers and the brake bands, energizing means for the solenoids, and means for connecting the solenoids in series or in parallel with the said energizing means for the useful purpose herein specified.

2. In a vehicle brake of the kind described, the combination with the brake bands of an auto vehicle, of solenoids mounted on the vehicle chassis, plungers movable into and out of the solenoids, energizing means for the solenoids, means for connecting the solenoids in series or in parallel across the said energizing means, and manually controlled means for mounting on the steering wheel of the vehicle whereby the aforesaid means may be rendered operative.

3. In a vehicle of the class described, the combination with the brake bands of an auto vehicle, of levers pivotally mounted on the vehicle chassis, connections between the levers and the brake bands, and electrically operated means for rocking the said levers to set the brake bands with different degrees of intensity.

4. In a vehicle brake of the kind described, the combination with the brake bands of an auto vehicle, of levers pivotally mounted on the vehicle chassis, connections between the levers and the brake bands, electrically operated means for rocking the said levers to set the brake bands with different degrees of intensity, and supplemental manually controlled electrically operated means mounted on the steering wheel by which the aforesaid means are controlled.

5. In a vehicle brake of the kind described, the combination with the brake bands of an auto vehicle, of levers pivotally mounted on the vehicle chassis, links connecting the levers at one end with the brake bands, solenoids mounted on the vehicle chassis, plungers movable in the solenoids and pivotally connected to the aforesaid levers, energizing means for the solenoids, and means for throwing the solenoids in series or in parallel across the said energizing means for the useful purpose specified.

In testimony whereof I affix my signature.

CHARLES W. CUNNINGHAM.